United States Patent [19]

Klassen

[11] 3,988,279

[45] Oct. 26, 1976

[54] THERMOSETTING CONCRETE-CONTAINING EPOXY

[75] Inventor: Harold C. Klassen, New Albany, Ind.

[73] Assignee: Celanese Coatings & Specialties Company, Louisville, Ky.

[22] Filed: Apr. 23, 1975

[21] Appl. No.: 570,906

[52] U.S. Cl. ............................ 260/29.2 EP; 106/90
[51] Int. Cl.² ..................................... C08G 51/24
[58] Field of Search............. 260/29.2 EP, 47 EN; 427/195, 37 EP; 106/90

[56] References Cited
UNITED STATES PATENTS

| | | | |
|---|---|---|---|
| 3,198,758 | 8/1965 | Donnelly | 260/6 |
| 3,211,675 | 10/1965 | Johnson | 260/2.5 |
| 3,240,736 | 3/1966 | Beckwith | 260/29.2 |
| 3,310,511 | 3/1967 | Reinert | 260/29.2 |
| 3,477,979 | 11/1969 | Hillyer | 260/29.2 |

*Primary Examiner*—Theodore E. Pertilla
*Attorney, Agent, or Firm*—Herbert P. Price; K. A. Genoni; T. J. Morgan

[57] ABSTRACT

Improved concretes and mortars are made from a hydraulic cement, e.g., Portland cement, and aggregate, plus a curable epoxy resin powder. After the concrete or mortar has cured by hydration, it is heated to a temperature high enough to cause the epoxy resin powder to melt, flow and cure.

11 Claims, No Drawings

THERMOSETTING CONCRETE-CONTAINING EPOXY

BACKGROUND OF INVENTION

This invention relates to hydraulic cements containing epoxide resins. More particularly, this invention relates to pre-formed or pre-cast concrete articles which have been modified with thermosetting epoxide resin compositions.

The modification of hydraulic cements with epoxide resins is well known. See, for example, U.S. Pat. Nos. 3,477,979, 3,310,511, 3,198,758, and 3,240,736.

However, the use of epoxide resins in preparing pre-cast concrete articles has been difficult for several reasons. In the first place, the prior art employed essentially liquid or resinous epoxy resins and room temperature curing agents. Thus, the pot life or working life of the composition was severely limited, as the mixture immediately begins setting up when the epoxide resin curing agent and the liquid epoxy resin are mixed together. In addition, the use of two-component systems necessarily means that errors in mixing on the job site often occur. Finally, because of the room temperature curable properties of the curing agent/epoxy resin mixture, large amounts of waste occur due to premature curing.

Another significant problem in utilizing liquid epoxy resins in combination with hydraulic cement has been the difficulty in obtaining a uniform composition dispersion in the reaction mixture. Furthermore, as the mixture is worked to insure uniform distribution throughout the mold, the liquid epoxide resin often migrates to the surface, significantly reducing pot life and cured state properties.

Thus, it is an object of this invention to provide a one-package hydraulic cement-based system.

It is another object of this invention to provide epoxide resin-containing cements having improved workability and indefinite pot lives.

It is yet another object of this invention to prepare a pre-cast concrete object which possesess improved strength, adhesion and chemical resistance properties.

These and other objectives are obtained by preparing the compositions of the instant invention.

SUMMARY OF INVENTION

Basically, the instant invention involves the discovery that improved pre-cast concrete articles can be prepared from a mixture of hydraulic cement the desired aggregate, and a curable epoxy resin powder wherein the epoxy resin has a modified Durran's melting point in excess of about 75° C. The materials are mixed in typical concrete mixing apparatus and cast in the desired shape. The concrete article is then left at ambient temperatures for a time sufficient for the concrete to set and to at least partially hydrate. The article is then heated at temperatures ranging from about 200°–500° F. for from one to twenty hours to melt, flow and cure the epoxy resin powder. The resulting pre-cast concrete products exhibit improved chemical resistance and physical strength properties when compared to prior art liquid epoxy-concrete systems. In addition, the compositions of the instant invention may be prepared in a one-package state and sift-mixed together. After water is added and the product cast and subjected to curing temperatures, the curing agent is activated, resulting in a cured product.

DESCRIPTION OF INVENTION

The cements employed herein are hydraulic cements — that is to say, cements which are watersettable, such as, for example, gypsum cement, the fast and slow setting modified gypsum cements, the high alumina cements, (e.g., luminite cement), Portland cement, Portland pozzolan cement, quicklime and lime pozzolan cements. The term "Portland cement", as used herein, includes those hydraulic cements, the essential ingredients of which are calcium silicates, tricalcium silicate, and dicalcium silicate. Other materials, such as compounds of lime, aluminum, iron oxide, magnesium, sodium, potassium and sulfur, are also generally present. The actual composition of the various Portland cements may vary somewhat, depending on the source of the basic material from which it is prepared, but all are well known to those skilled in the art.

In preparing the concrete used in the instant invention, it is necessary to use an aggregate. The aggregate may be of very small size, such as very fine sand, up to larger materials, such as rocks, broken stones, and the like. Suitable aggregates may include, but are not limited to, sand, gravel, crushed rock, slag, volcanic ash, exploded shale, clay, exploded clay, pearlite, vermiculite, pumice, cinders, wood pulp, wood chips, wood shavings, sawdust, cork, emery, trap rock, glass beads, ground glass, pieces of foamed phenolic resin, foamed polyester resin, and other foamed resins.

The epoxide resin used in the composition of the instant invention should have a modified Durran's melting point in excess of about 75° C. The melting point can range from about 75° C. to about 180° C., and preferably about 95° C. to about 135° C. This melting point is determined by melting about 3 grams of the resin to be tested into a test tube. A thermometer bulb is inserted into the resin as it is melted, and the resin is allowed to cool with about one-half of the thermometer bulb remaining in the resin. 50 gms. of mercury are then poured over the resin in the test tube, and the test tube is inserted into an oil bath. The test tube is then heated at the rate of 2° C. per minute, and the modified Durran's melting point is that point at which the resin in the tube breaks through the top surface of the mercury.

Epoxide resins having the desired melting points contain more than one 1,2-epoxy group per molecule and may be saturated or unsaturated, aliphatic, cycloaliphatic, aromatic or hetereocyclic. They can be monomeric or polymeric in nature.

Useful epoxide resins include glycidyl ethers of polyhydric phenols obtained by reacting a polyhydric phenol in an excess of epichlorohydrin with sodium hydroxide. Such polyhydric phenols include bisphenol A (p,p'-dihydroxydiphenylpropane), resorcinol, hydroquinone, 4,4'-dihydroxybenzophenone, 4,4'-dihydroxybiphenyl and novolak resins containing more than two phenol moieties linked through methylene bridges.

Other glycidyl ethers of polyhydric phenols are prepared by reacting diepoxides with added dihydric phenol.

The epoxide resins also include epoxidized hydrocarbons having the desired Durran's melting points.

Other epoxide resins are polymers and copolymers of vinyl polymerizable epoxides, such as allyl glycidyl ether, glycidyl and glycidyl methacrylate.

The most preferred epoxide resins are glycidyl polyethers of polyhydric phenols, particularly, the glycidyl polyethers of bisphenol A. In particular, those bisphenol A-based epoxide resins having weights per epoxide group in the range of about 550 to about 6000 are useful with the most useful being in the range of about 850–2000.

Where liquid or semi-liquid products having modified Durran's melting points below about 75° C. are utilized, instability in the cement/epoxide resin/curing agent mixture results.

The curing agents which are mixed with the compositions of th instant invention are neutral or basic type curing agents, i.e., curing agents which do not interfere with the alkalinity of the cement.

The curing agents which are particularly useful herein are of the latent type which are solid at room temperature and preferably melt and activate at above about 60° C. Examples of such curing agents include aliphatic and aromatic polyamines, tertiary amines, tertiary amine salts, e.g., metaphenylene diamine, methylene dianiline, benzyl dimethylamine hydrochloride, benzyl trimethyl ammonium chloride, etc. Additional preferred curing agents include melamine, benzoquanamine, dicyandiamide, and the like. Also included are the polyalkoxy methylol melamines, particularly the hexamethoxymethyl melamines and the blocked diisocyanates.

The epoxy resin curing agent will be added as is well known in the art, either based on equivalence or on weight, in the range of about 1–25 percent, by weight, based upon the epoxy resin, preferably about 1–10 percent, by weight.

The epoxy resin which is chosen is crushed to a particle size of less than 50 mesh U. S. Standard Sieve. In microns the particle size will range from less than about 300 microns down to about 10 microns. This may be accomplished by conventional grinders, mixers, other apparatuses capable of pulverizing the epoxy resin. After the epoxide resin is crushed, it is mixed with the epoxy resin curing agent. This mixture may be carried out by dry mixing, i.e., as by mixing crushed epoxy resin and crushed curing agent. However, it is preferred to melt blend the epoxy resin and the curing agent, at a temperature below their reaction temperatures. The blend is then cooled and crushed or pulverized to the desired particle size. This material is then mixed with cement and aggregate. Immediately before use water is added, and the entire composition is mixed thoroughly. It is then poured into a form and left at ambient temperature until the cement sets and at least partially hydrates. Generally this requires about 24 hours, preferably about one week, although the material can be left indefinitely at room temperature before heating the cement article to temperatures to insure cure of the epoxide resin and the curing agent. When curing is finally desired, temperatures as low as 200° F. to as high as 500° F. are employed. Where the lower range cure temperatures are utilized, cure times of as long as 20 hours may be required; however, where temperatures of 400°–500° F. are employed, cure times as short as two to three hours may be required.

The curable epoxide resin powder, the cement, the aggregate, and the water should be mixed in the following ratios, by weight:

| | |
|---|---|
| Cement | 100 |
| Curable epoxide resin powder | 5–75 |
| Water | 20–300 |

-continued

| | |
|---|---|
| Aggregate | 10–500 |

In addition, the composition of the instant invention may be compounded with conventional extenders, such as polynuclear aromatic hydrocarbon mixtures, thermoplastic styrenes, cumerone indine resins, rosins, polyphenols, sulfonamide resins, phosphate resins, aryl sulfonamide formaldehyde resins, maleic resins, and the like. These modifiers can be added for the purpose of economy or modification of physical properties to improve workability time, pot life, etc. The compositions of the instant invention can also be modified with conventional amounts of pigments, dyes, surface active agents, viscosity reducers, freeze-resistant agents, antibacterial agents, and the like. Flow control agents, as described in U.S. Pat. No. 3,730,930, can be utilized in the compositions of the instant invention, although they are not required.

In the following examples, all parts and percentages are by weight, unless otherwise specified. cEXAMPLE 1

100 parts of a bisphenol A-epichlorohydrinbased epoxide resin having a modified Durran's melting point of 100° C. and a weight per epoxide of 950 (Epoxide 1), were melt-mixed with 4 parts of dicyandiamide, and hammer milled to a mesh size of 70 percent passing through a 50 mesh (U.S. Standard Sieve). This material was then blended into the mixture set forth in Table 1. Following intimate mixing, the various amounts of water set forth were mixed in. The samples were then poured into a mold and left for one week at room temperature/50 percent relative humidity. After this period, the samples were heated for two hours at 400° F. and were evaluated with the results set forth in Table 1.

Table 1.

| Composition (pbw): | 1 | 2 | 3 | 4 |
|---|---|---|---|---|
| Portland Cement | 100 | 100 | 100 | 100 |
| New Jersey Sand, Grade No. 2 | 86 | 86 | 86 | 86 |
| Grade No. 1 | 86 | 86 | 86 | 86 |
| Grade No. 0 | 128 | 98 | 86 | 68 |
| Epoxide Resin 1/Dicyandiamide, Powder (1) | — | 30 | 43 | 60 |
| Water | 52 | 57 | 60 | 65 |
| Compositional Variables: | | | | |
| Epoxy/Cement Ratio | — | 0.30 | 0.43 | 0.60 |
| Water/Cement Ratio | .52 | 0.57 | 0.60 | 0.65 |
| Aggregate/Binder Ratio | 3.0 | 2.08 | 1.80 | 1.50 |
| Physical Strength Properties: | | | | |
| Tensile Strength (psi) | 210 | 1070 | 1420 | 1680 |
| Flexural Strength (psi) | 810 | 2430 | 2980 | 2980 |
| Compressive Strength (psi) | 3800 | 7500 | 8700 | 8100 |

EXAMPLE 5

Utilizing the procedure as set forth in Example 1, various epoxy resins/curing agents mixtures were evaluated in the following composition.

| | Parts |
|---|---|
| Portland Cement | 100 |
| New Jersey Sand, Grade No. 2 | 86 |
| New Jersey Sand, Grade No. 1 | 86 |
| New Jersey Sand, Grade No. 0 | 86 |
| Epoxy modifier | 43 |

-continued

| | Parts |
|---|---|
| Water | 60 |

Each sample was allowed to hydrate for one week at 77° F. and then cured for two hours at 400° F., with the results set forth in the attached table. In the table, Epoxide Resin 2 is a diglycidyl ether of bisphenol A, having a weight per epoxide of 600, and a modified Durran's melting point of 80° C.

| Resin | Curing Agent | Tensile Strength (psi) | Flexural Strength (psi) | Compressive Strength (psi) |
|---|---|---|---|---|
| Epoxide Resin 1 | Dicyandiamide (4 phr) | 1180 | 2980 | 8700 |
| Epoxide Resin 1 | Melamine (4 phr) | 1350 | 3450 | 9400 |
| Epoxide Resin 1 | None | 810 | 1790 | 7200 |
| Epoxide Resin 2 | Melamine (4 phr) | 1340 | 3050 | 8900 |
| Epoxide Resin 2 | Benzoguanamine (7.8 phr) | 1550 | 3050 | 7600 |
| Epoxide Resin 1 | Methylene Dianiline (5.9 phr) | 700 | 1230 | 5100 |

What is claimed is:
1. A cement composition comprising:
   a. 100 parts by weight of hydraulic cement;
   b. about 5 to about 75 parts by weight of a curable epoxide resin powder which is a blend of an epoxide resin having more than one 1,2-epoxide group per molecule and a modified Durrans melting point in excess of about 75° C. and a neutral or basic type latent curing agent which melts and is activated above 60° C. wherein said curing agent is present in the amount of about 1 to about 25 percent by weight, based on the weight of the epoxide resin;
   c. about 20 to about 300 parts by weight of water; and
   d. about 10 to about 500 parts by weight of aggregate.
2. The composition of claim 1 wherein the curing agent is melamine.
3. The composition of claim 1 wherein the curing agent is dicyandiamide.
4. The composition of claim 1 wherein the curing agent is benzoguanamine.
5. The composition of claim 1 wherein the cement is a Portland cement.
6. The composition of claim 1 wherein the epoxide resin is a glycidyl polyether of a polyhydric phenol, having a weight per epoxide in the range of about 550 to about 6000, and a melting point of 75°–180° C.
7. The composition of claim 1 wherein the epoxide resin is a glycidyl polyether of a polyhydric phenol having a weight per epoxide in the range of about 850–2000 and a melting point in the range of about 95°–135° C.
8. A process for preparing a pre-cast concrete article which comprises:
   a. dry mixing
      1. 100 parts by weight of hydraulic cement;
      2. about 5 to about 75 parts by weight of a curable epoxide resin powder, which is a blend of an epoxide resin having more than one 1,2-epoxide group per molecule and a modified Durrans melting point in excess of about 75° C., and a neutral or basic type latent curing agent which melts and is activated above 60° C. wherein said curing agent is present in the amount of about 1 to about 25 percent by weight, based on the weight of the epoxide resin; and
      3. about 10 to about 500 parts of aggregate;
   b. adding and mixing about 20 to about 300 parts by weight of water;
   c. allowing the cement to at least partially hydrate at ambient temperature; and
   d. heating the mixture to a temperature of about 200° to 500° F. for a time sufficient to cure the epoxide resin powder.
9. The process of claim 8 wherein the epoxide resin and the latent curing agent, prior to blending, have been pulverized to a particle size of about 10 to about 300 microns.
10. The process of claim 8 wherein the epoxide resin and latent curing agent are melt mixed and pulverized to a particle size of about 10 to about 300 microns prior to dry mixing with the hydraulic cement and aggregate.
11. The process of claim 8 wherein the hydraulic cement in the mixture is allowed to cure under ambient conditions for at least about one day.

* * * * *